(12) United States Patent
Tokumoto

(10) Patent No.: US 8,472,042 B2
(45) Date of Patent: Jun. 25, 2013

(54) IMAGE FORMING APPARATUS WHICH FORMS AN IMAGE BASED ON PRINT DATA DESCRIBED IN A PAGE DESCRIPTION LANGUAGE

(75) Inventor: Hirokazu Tokumoto, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 404 days.

(21) Appl. No.: 12/846,757

(22) Filed: Jul. 29, 2010

(65) Prior Publication Data

US 2011/0058191 A1 Mar. 10, 2011

(30) Foreign Application Priority Data

Sep. 10, 2009 (JP) ................. 2009-209812

(51) Int. Cl.
*G06K 15/00* (2006.01)
*G06F 3/06* (2006.01)

(52) U.S. Cl.
USPC ......... 358/1.14; 358/1.16; 358/1.17; 711/154

(58) Field of Classification Search
USPC ....................................... 711/154
See application file for complete search history.

(56) References Cited

U.S. PATENT DOCUMENTS

2008/0284788 A1* 11/2008 Ando et al. .................. 345/557

FOREIGN PATENT DOCUMENTS

JP 2002-127510 A 5/2002

OTHER PUBLICATIONS

"JPEG XR Leads to 8-Bit Tone Ultra Camera", Nikkei Electronics, pp. 71-77, issued Dec. 29, 2008.
"Current report of standardization for the JPEG XR image compression", The Journal of The Institute of Image Electronics Engineers of Japan, vol. 37, No. 4, pp. 502-512, issued Jul. 25, 2008.

* cited by examiner

*Primary Examiner* — Barbara Reinier
(74) *Attorney, Agent, or Firm* — Fitzpatrick, Cella, Harper & Scinto

(57) ABSTRACT

The present invention provides a technique for reducing image quality deterioration and suppressing print performance reduction. A raster image processor (RIP) generates intermediate data by interpreting PDL data, and stores it in a memory. In a case where the memory area overflows in the middle of intermediate data generation and storage processing on the print data for one page, rendering is executed based on the intermediate data. In accordance with JPEG XR, tile division is performed. An encoding parameter indicative of lossless-encoding or lossy-encoding is determined in accordance with each tile, and encoding is executed. The encoded image data is stored in a background image memory area as a background image of intermediate data that will subsequently be generated. When subsequent intermediate data generation is completed, rendering is executed, the rendered image is synthesized with the image saved as a background image, then the data is outputted.

5 Claims, 10 Drawing Sheets

FIG. 5

Document Start

RGB color

Text Start

PageSize xxx yyy    PaperType LTR normal

Text String "STANDARD TEST FOR PRINTER

TextType MS-Mincho    FontSize 23 pt

Image size 64000 width height xy

Background Image "00000002222222 ---------- 22222220000000"

Graphic x y = ( 230 455) Rectangle shape fill Black ----- x y = ( 330 600) Line shape fill Black -----

Image size 3400 width height xy

Image "0000000FFFFFFAAAAAA -------- 4444FFFFFFAA00000"

Document Finish

IMAGE FORMING APPARATUS WHICH FORMS AN IMAGE BASED ON PRINT DATA DESCRIBED IN A PAGE DESCRIPTION LANGUAGE

BACKGROUND OF THE INVENTION

1. Field of the Invention

The present invention relates to an image forming apparatus and a control method of the apparatus.

2. Description of the Related Art

An apparatus having a print function, such as printers, copying machines or the like, interprets print data described in a page description language, converts rendering commands in the print data to intermediate data which is suitable for rendering, and stores the intermediate data in a memory. In accordance with the intermediate data stored in the memory, the apparatus performs processing for bitmap data rendering in a rendering memory. When the apparatus interprets print data and stores intermediate data in a memory, there is a case that the memory becomes full (memory overflow). In this case, the print data interpretation and intermediate data generation are temporarily suspended, and rendering is performed using the intermediate data that has already been stored in the memory. Then, the rendered image is registered in another memory, which has been prepared in advance, as a background image of intermediate data that will subsequently be generated. This process is called fallback processing. In the fallback processing, the background image is encoded for compression in order to vacate the memory area for the next intermediate data. If lossy-encoding is adopted in the encoding process, image quality deteriorates. Furthermore, if the background image encoded by an initial lossy-encoding does not fit in a compressed image data storage area, image rendering must be performed again based on the intermediate data and re-compression must be performed with a different quantization coefficient.

In a case where the background image cannot fit in a compressed image data storage area, conventionally, a technique is available in that the compression rate of image data included in the intermediate data is increased (e.g., Japanese Patent Laid-Open No. 2002-127510).

JPEG XR introduced in "Current report of standardization for the JPEG XR image compression", The Journal of The Institute of Image Electronics Engineers of Japan, Vol. 37, No. 4, pp. 502-512, issued Jul. 25, 2008 or in Nikkei Electronics issued on Dec. 29, 2008, p71 to 77 (issued on Dec. 29, 2008) bases HD Photo, the still-image encoding technique. JPEG XR is characterized by breaking down an image to be encoded into tile areas of variable sizes. For instance, the central part of an image is broken down to small areas while the edge part of the image is broken down to large elongated areas, so as to enable an efficient access to the central part of the image, which is assumed to be the area of interest.

In fallback processing, if lossy-encoding is employed for compressing the entire rendered background image, image quality may deteriorate. Furthermore, if lossy-encoding is employed on image data of intermediate codes as in the aforementioned prior art, rendering must be performed again. Moreover, since plural numbers of times of image encoding and decoding may be necessary, print performance reduction is caused.

SUMMARY OF THE INVENTION

The present invention has been made in view of the above-described problems. The present invention provides a technique for reducing image quality deterioration and suppressing print performance reduction in conversion of print data described in a PDL to intermediate data, even in an event of memory overflow that entails fallback processing.

In order to solve the above-described problems, for example, the present invention in its aspect provides an image forming apparatus which forms an image on a print medium based on print data described in a page description language, comprising: a conversion unit configured to convert inputted print data described in a page description language to intermediate data which is appropriate for rendering, and store the converted intermediate data in an intermediate data memory set in advance; a rendering unit configured to generate raster image data in accordance with the intermediate data obtained by the conversion unit, and also generate attribute data in pixel unit; an encoding/decoding unit configured to be able to set an encoding parameter in tile unit, generate encoded data by encoding data in tile unit in accordance with the set encoding parameter, and store the generated encoded data in an encoded data memory set in advance, and also configured to be able to decode the encoded data stored in the encoded data memory; a determination unit configured to, in a case where an overflow occurs in the intermediate data memory while the conversion unit is performing conversion on intermediate data for one page and storage of the data in the intermediate data memory, determine whether or not the overflow is a first time for the page of interest or a second or further time; a fallback processing unit configured to, in a case where an overflow occurs in the intermediate data memory while the conversion unit is performing conversion on intermediate data for one page and storage of the data in the intermediate data memory, execute fallback processing in accordance with a determination result of the determination unit; and an image forming unit configured to, when rendering is completed based on the intermediate data for one page, execute image forming processing based on image data obtained as a rendering result, wherein, in a case where an overflow occurs in the intermediate data memory while the conversion unit is performing conversion on intermediate data for one page and storage of the data in the intermediate data memory, the fallback processing unit controls the rendering unit to perform rendering in accordance with the intermediate data which has already been stored in the intermediate data memory, in a case where the determination by the determination unit indicates that the overflow is a first time, the fallback processing unit performs tile division on rendered image data in accordance with the attribute data of each object of the image data, and determines an encoding parameter for each tile, in a case where the determination by the determination unit indicates that the overflow is a second or further time, the fallback processing unit synthesizes the rendered image data with decoded image data which is obtained by decoding processing of the encoding/decoding unit, performs tile division based on attribute data of the synthesized image data, and determines an encoding parameter for each tile, the fallback processing unit controls the encoding/decoding unit to encode the rendered image data or synthesized image data in accordance with the determined encoding parameter, and store obtained encoded data in the encoded data memory, and the fallback processing unit clears the intermediate data memory, and have the conversion unit resume conversion processing.

According to the present invention, it is possible to reduce image quality deterioration and suppress print performance reduction in conversion of print data described in a PDL to intermediate data, even in an event of memory overflow that entails fallback processing.

Further features of the present invention will become apparent from the following description of exemplary embodiments with reference to the attached drawings.

BRIEF DESCRIPTION OF THE DRAWINGS

FIG. 5 shows a description example written in a Page Description Language for printing the sample image shown in FIG. 4;

DESCRIPTION OF THE EMBODIMENTS

An embodiment of the present invention will be described hereinafter in detail with reference to the accompanying drawings. Note that the embodiment provides an example in which the present invention is applied to a multi-function peripheral (MFP) as an image forming apparatus.

Figure 1:
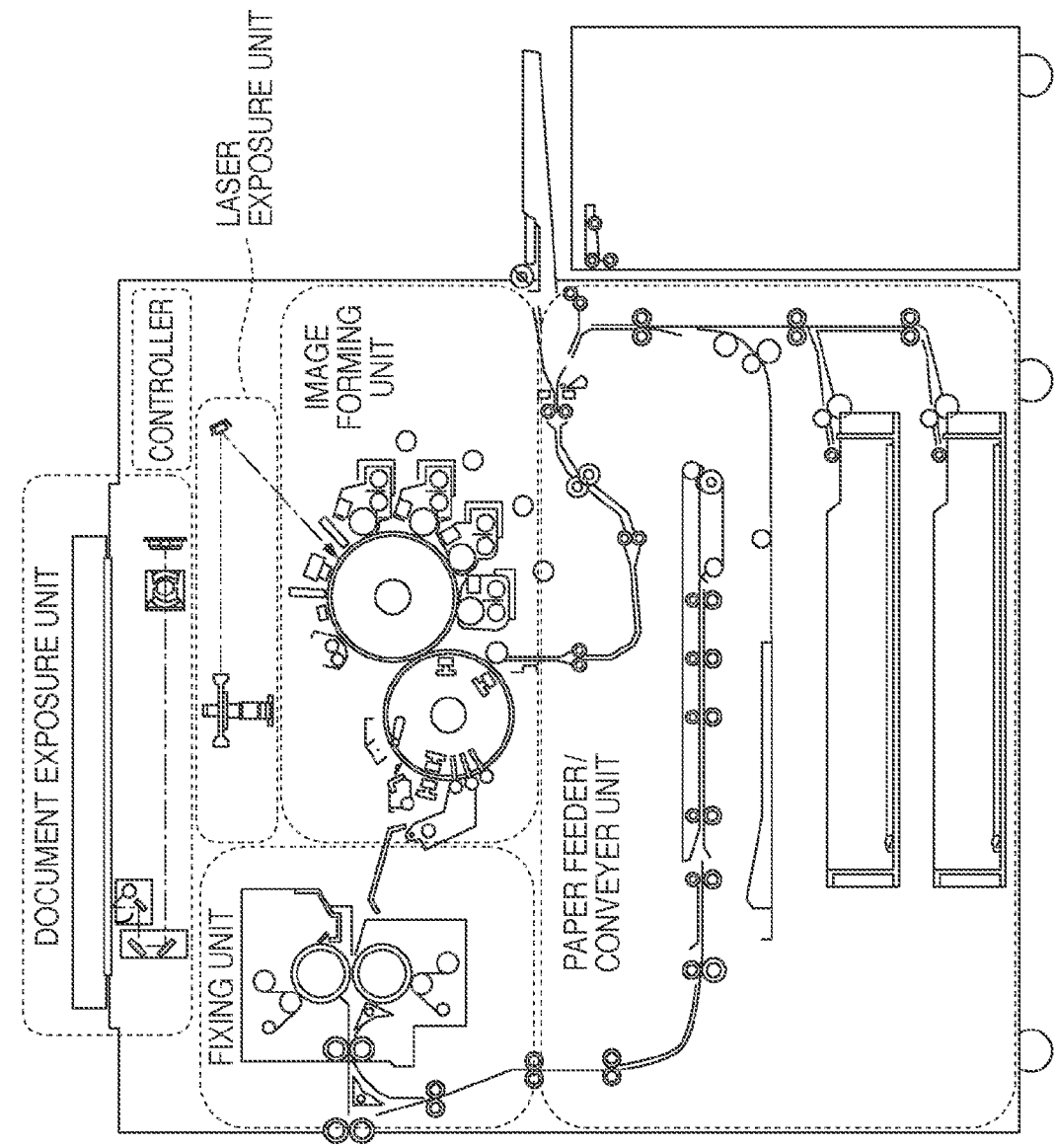
FIG. 1 is a cross-section showing a construction of a multi-function peripheral serving as an image forming apparatus, applied by an embodiment of the present invention.

The MFP according to the present embodiment comprises, as shown in FIG. 1, a controller which controls the overall apparatus, a document exposure unit, a laser exposure unit, an image forming unit, a fixing unit, and a paper feeder/conveyer unit. The document exposure unit irradiates light on an original document placed on a platen for optically reading the original document's image, and converts the image into electric signals for image data generation. The laser exposure unit introduces light beams, such as laser beams modulated in accordance with the image data, to a rotative polygon mirror which rotates at uniform angular velocity, thereby irradiating the light beams as reflective scanning beams to a photosensitive drum. The image forming unit rotates the photosensitive drum, electrostatically charges the drum by an electrostatic charger, develops a latent image with toner which has been formed on the photosensitive drum by the laser exposure unit, and transfers the toner image to a sheet. Image forming is performed by executing a series of electrophotography process, including collection of micro-toner which was not been transferred to the sheet but left on the photosensitive drum. In this stage, the sheet is wrapped around at a predetermined position of the transfer belt. While the sheet is rotated four times, each of the development units (development station) respectively having magenta (M), cyan (C), yellow (Y), and black (K) toner takes turns to repeatedly execute the aforementioned electrophotography process in sequence. After four times of rotation, the sheet to which four-color toner image is transferred is separated from the transfer drum and conveyed to the fixing unit. The fixing unit is configured with a combination of rollers and belts, and a heat source such as a halogen heater. The fixing unit fuses and fixes, with heat and pressure, the toner on the print medium (sheet), to which the image forming unit transfers the toner image. The paper feeder/conveyer unit comprises one or more sheet storage, such as a sheet cassette or a paper deck. In accordance with an instruction from the printer controller, the paper feeder/conveyer unit takes a sheet from the plural sheets stored in the sheet storage and conveys it to the image forming unit and fixing unit. The sheet is wrapped around the transfer drum of the image forming unit and rotated four times before being conveyed to the fixing unit. While the sheet is rotated four times, the aforementioned Y, M, C, and K toner images are transferred to the sheet. In a case of double-face image forming on the sheet, the sheet is controlled to go to a conveyance path, where a sheet that has passed the fixing unit is conveyed again to the image forming unit. The printer controller communicates with an MFP controller, which controls the entire MFP, for executing controls in accordance with an instruction from the MFP controller, and gives instructions for maintaining overall consistency and smooth operation, while managing the status of the aforementioned scanner, laser exposure unit, image forming unit, fixing unit, and paper feeder/conveyer unit. Image forming of the MFP according to the present embodiment is performed in the foregoing manner.

Figure 2:
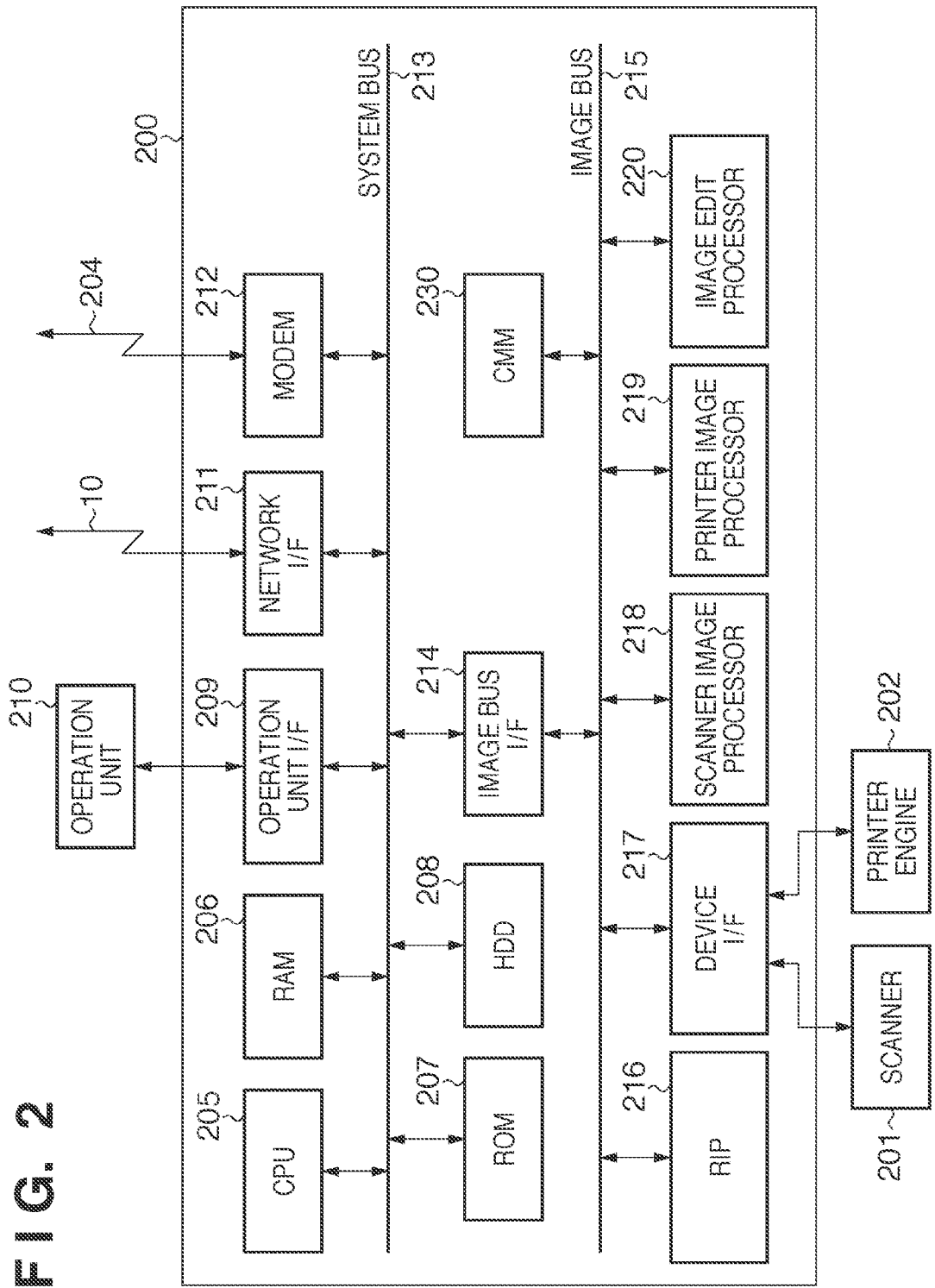
FIG. 2 is a circuit diagram showing a controller of the multi-function peripheral.

FIG. 2 is a block diagram showing an MFP's controller according to the present embodiment. In FIG. 2, a controller 200 is connected to a scanner 201, serving as an image input device, and a printer engine 202, serving as an image output device, and performs control for image data reading and printing. The controller 200 is also connected to a LAN 10 or a public line 204 for controlling input or output of image data and device information through the LAN 10 and the public line 204.

A CPU 205 is a central processing unit for controlling the overall MFP. A RAM 206 serves as a system work memory for operation of the CPU 205, and also serves as an image memory for temporarily storing inputted image data. A ROM 207 is a boot ROM in which a system boot program is stored. A HDD 208 is a hard disk drive for storing a system software for various processing, inputted image data and the like. An operation unit I/F 209 is an interface unit for an operation unit 210 including a display screen capable of displaying image data or the like. The operation unit I/F 209 outputs operation screen data to the operation unit 210. Also, the operation unit I/F 209 has a role for transmitting data, inputted by an operator through the operation unit 210, to the CPU 205. A network interface 211, which is realized by, for instance, a LAN card, performs data input and output between the MFP and an external apparatus through connection with the LAN 10. Furthermore, a MODEM 212 connects with the public line 204 for performing data input and output between the MFP and an external apparatus. The aforementioned units are provided on a system bus 213.

An image bus I/F 214 is an interface for connecting the system bus 213 to an image bus 215, which is provided for transferring image data at high speed, and serves as a bus bridge for converting a data structure. Connected to the image bus 215 are a raster-image processor (RIP) 216, a device I/F 217, a scanner image processor 218, a printer image processor 219, an image edit processor 220, and a color management module (CMM) 230.

The raster-image processor (RIP) 216 interprets a Page Description Language (PDL), converts the PDL to intermediate data which will be described later, and develops the intermediate data to a raster image by rendering. Details of the RIP 216, to which the present embodiment is applied, will be described later. The device I/F unit 217 connects the scanner 201 and printer engine 202 to the controller 200 for synchronous or asynchronous image data conversion.

The scanner image processor 218 performs various processing, such as correction, modification, editing or the like, on image data inputted by the scanner 201. The printer image processor 219 performs processing, such as correction and resolution conversion appropriate for a printer engine, on image data to be printed. The image edit processor 220 performs various image processing, such as image data rotation, compression/decompression or the like. The CMM 230 is a dedicated hardware module for performing color conversion (also referred to as color-space conversion) on image data based on a profile or calibration data. A profile is information similar to a function for converting color image data, which is expressed in color space that is dependent on the machine, to image data which is expressed in color space that is independent of the machine (e.g., Lab). Calibration data corrects a color reproduction characteristic of the scanner 201 or the printer engine 202 in a color MFP.

Figure 3:
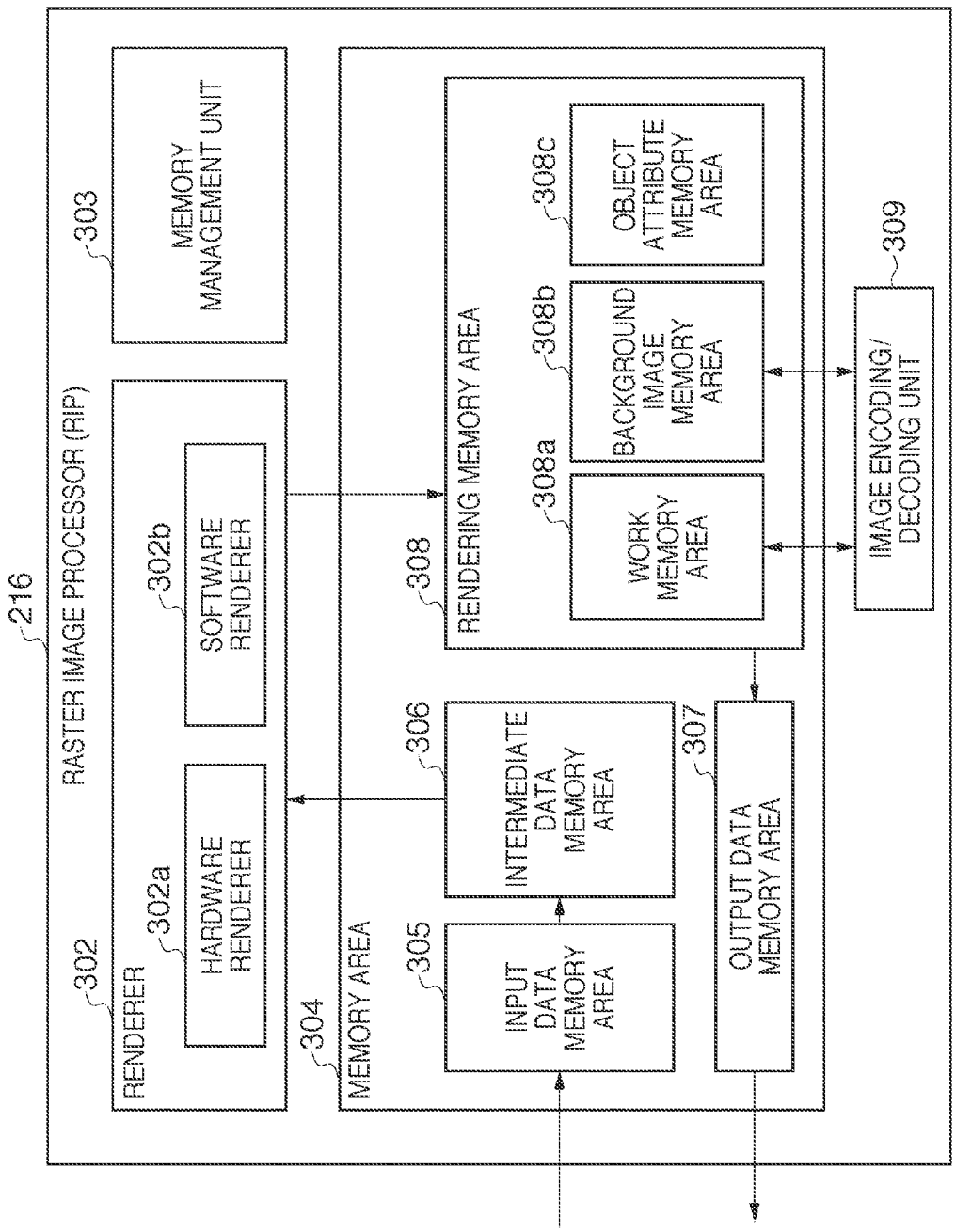
FIG. 3 is a block diagram showing a raster-image processor according to an embodiment of the present invention.

Next, the raster image processor (RIP) 216 according to the present embodiment is described with reference to FIG. 3. The RIP 216 comprises a renderer 302 which generates a raster image based on intermediate data generated in accordance with a rendering command described in a Page Description Language (PDL). The RIP 216 also comprises a memory management unit 303 for managing a memory, a memory area 304, and an image encoding/decoding unit 309 which is capable of encoding or decoding image data in accordance with JPEG XR. The memory area 304 includes an input data memory area 305 for receiving a rendering command, an intermediate data memory area 306 for holding intermediate data, an output data memory area 307 for storing a final raster image, and a rendering memory area 308 used in rendering. The renderer 302 comprises a hardware renderer 302a which performs rendering by a hardware, and a software renderer 302b which performs rendering by a software. The rendering memory area 308 includes a work memory area 308a which is used as a work memory at the time of rendering, a background image memory area 308b for storing, in an event of fallback processing, raster image data rendered in accordance with intermediate data that has already been generated, and an object attribute memory area 308c for storing object attribute data added at the time of rendering. The image encoding/decoding unit 309 is capable of encoding an image in units of tile constructed with a plurality of pixels, and employs JPEG XR, wherein each tile does not have to be the same size and lossless-encoding or lossy-encoding can be set for each tile.

Figure 4:
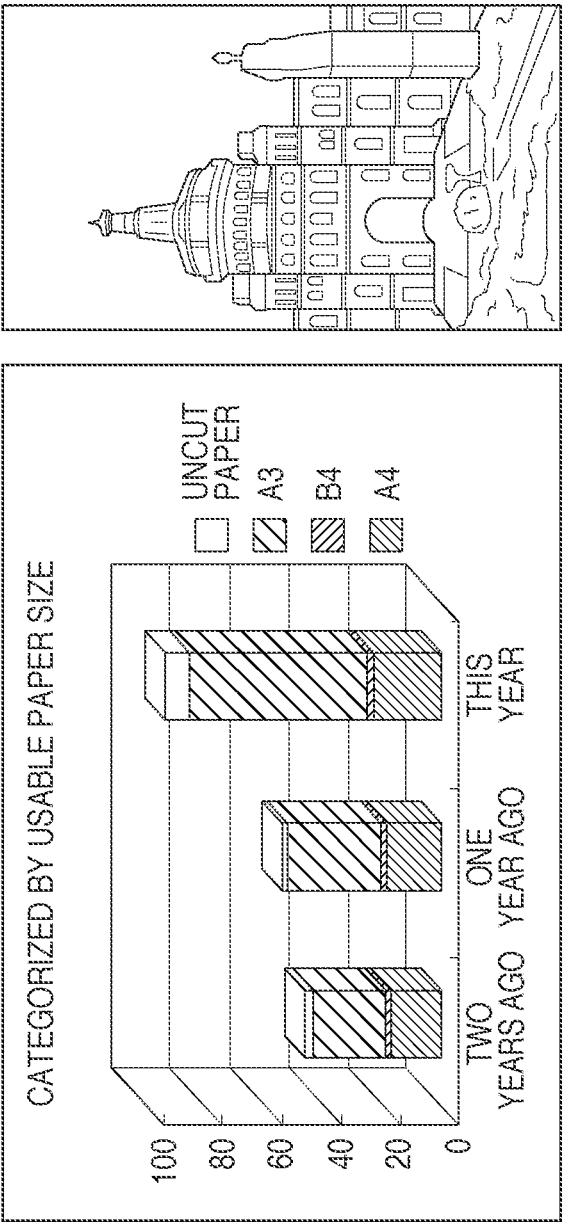
FIG. 4 shows a sample of an image to be printed.

Hereinafter, a specific example of processing executed by the RIP 216 according to the present embodiment is described. A description is provided assuming herein that, for printing a sample image shown in FIG. 4, the print data in a PDL shown in FIG. 5 is received. It should be noted that the sample image in FIG. 4 has three types of attributes: text data on the upper part of the page, graphic data on the left part of the page, and halftone image data (photographic image data) on the right part of the page. Also it should be noted that, since each object in the print data is described in the order of text data, graphic data, and halftone image data, the RIP 216 performs intermediate data generation and storage processing in the intermediate data memory area 306 in the same order.

Figure 6A:
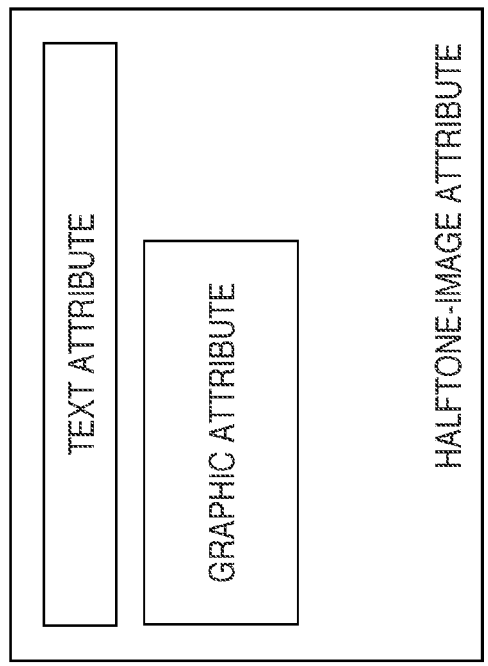
FIGS. 6A to 6D are explanatory views of image encoding in fallback processing.
Figure 6B:
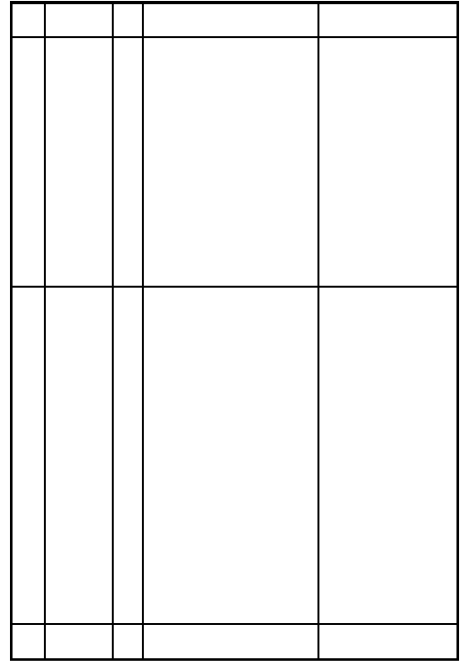
Figure 6C:
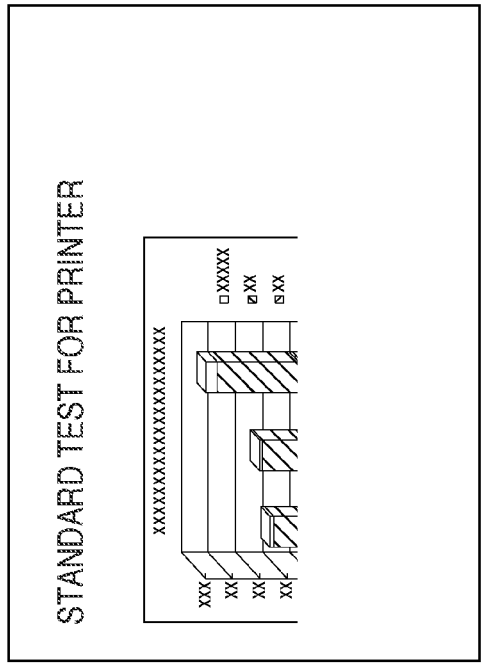
Figure 6D:
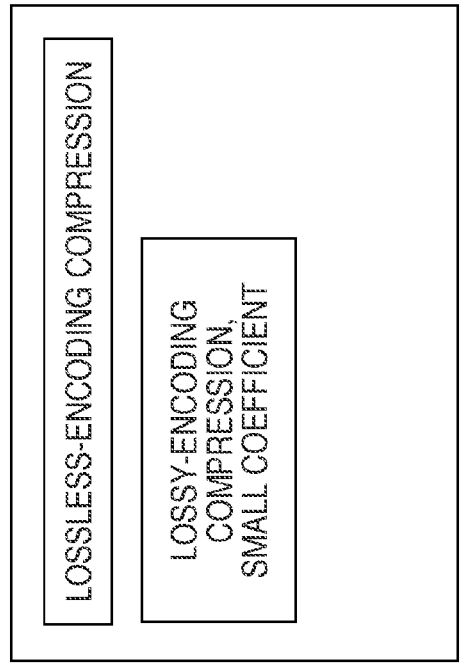

FIG. 6A shows an example of an image rendered in the work memory area 308a when a fallback occurs. Also, FIG. 6A is a resultant image rendered temporarily by the renderer based on the intermediate data which has been generated so far, when a memory overflow occurs while the RIP 216 interprets the PDL in FIG. 5 and stores the intermediate data corresponding to the graphic object in the intermediate data memory area 306 in FIG. 3. When such fallback processing occurs, a rendering object is rendered until the midway of the page. FIG. 6B is a diagrammatic view showing a distribution of object attribute bits in the object attribute memory area 308c, in a case where a fallback shown in FIG. 6A occurs. The RIP 216 stores an attribute (text, graphic, halftone image) of each pixel in the object attribute memory 308c at the time of rendering processing. As shown in FIG. 6B, the area other than the rendered area is regarded as a halftone-image attribute in default setting. FIG. 6C shows a state in which an image encoding method is determined for each object in an event of a fallback as shown in FIG. 6A. In a text-attribute area, edges such as characters and lines are expected to be sharp; therefore, lossless-encoding is desirable. On the other hand, for graphics and halftone images (photographic images), tonality rather than edges are the image-quality determining factor; therefore, lossy-encoding is desirable. In view of the above, according to the present embodiment, lossless-encoding is set for an area having a text attribute, while lossy-encoding is set for a non-text (graphic or halftone image) area. Furthermore, since graphics have fewer numbers of appearance colors than halftone images, thus can expect a high compression rate, a value of a quantization coefficient for the lossy-encoding is set smaller than that for the halftone-image encoding. In other words, a value of the quantization coefficient for halftone image encoding is set larger than that for the graphics' encoding. Note that the image encoding method determination processing will be described later with reference to the flowchart in FIG. 9.

After each object's encoding method (type of encoding) is set in the foregoing manner, tile division appropriate for the processing of the image encoding/decoding unit 309 is performed. In tile division, a tile boundary line is determined by extending each side of the respective circumscribed rectangles of two objects as shown in FIG. 6B (or FIG. 6C). If the adjacent objects have the same attribute, these are regarded as one object, and then tile division is performed.

Figure 7A:
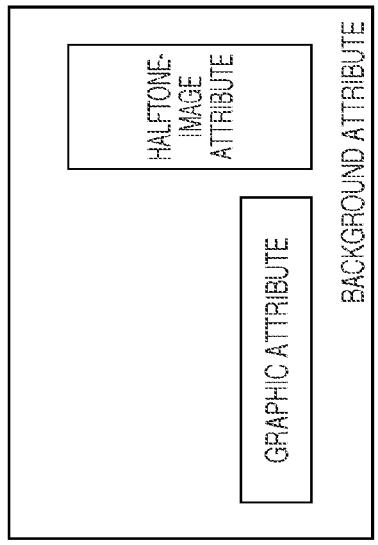
FIGS. 7A to 7E are explanatory views of image synthesizing and re-encoding after fallback processing.
Figure 7B:
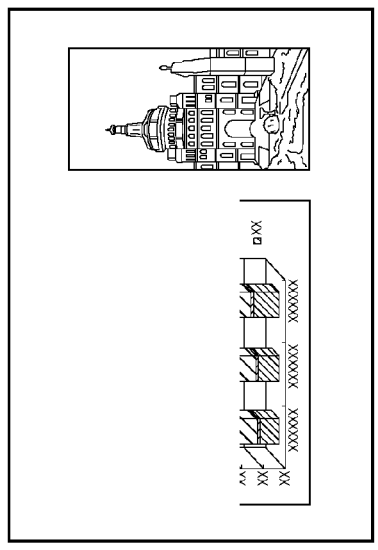
Figure 7E:
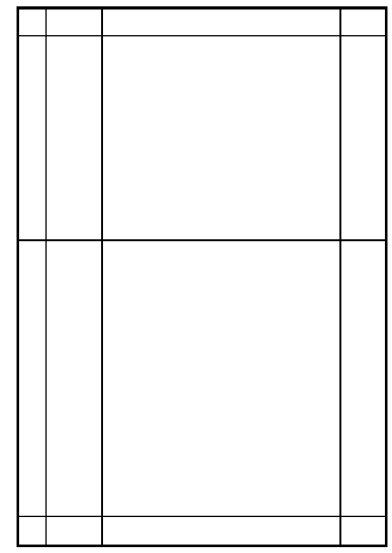
Figure 7D:
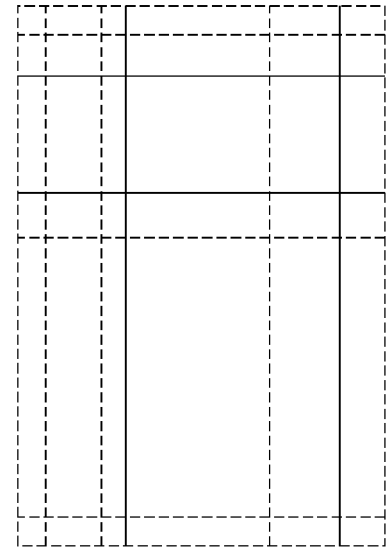
Figure 7C:
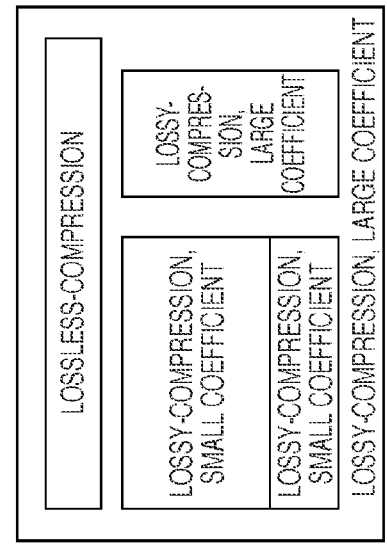

FIG. 7A is a resultant image rendered in the work memory area 308a in the state where, after a fallback occurs, conversion is resumed for converting the subsequent rendering commands in PDL to intermediate codes and rendering of the page is completed. The rendered image is synthesized with the background image data in FIG. 6A which has ultimately been encoded and compressed, and then subjected to encoding and outputting. FIG. 7B is an object attribute image in FIG. 7A after a fallback occurs. The graphic attribute and halftone image attribute defined in the PDL in FIG. 5, which are not included in the background image that has been rendered and compressed earlier, are defined in pixel unit. Assume that a fallback occurs, intermediate data generation and rendering are resumed, and the rendering is completed (or a memory overflow occurs again). In this stage, the image encoding/decoding unit 309 decodes the encoded image data stored in the background image memory area 308b (encoded data memory), and restores the data in the work memory area 308a. The RIP 216 synthesizes the previously encoded image data (decoded image data) with the image data, which is the rendering result this time. In the decoding process, whether the tile has been lossless-encoded or lossy-encoded is revealed, and the quantization coefficient used in the encoding is identified (see FIG. 7C). Therefore, based on the result of tile division performed in accordance with the information obtained then, and based on the result of tile division performed by the rendering this time, the RIP 216 is able to acquire synthesized tile division of the synthesized image (FIG. 7D). In FIG. 7D, the solid line represents a tile added by an additional object after the occurrence of a fallback, and the dashed line represents a tile registered in the background image. The RIP 216 reconfigures the tile division added after the occurrence of a fallback, and performs optimized tile division. Herein, tile division is reconfigured by, for instance, joining adjacent tiles into one tile if they have the same encoding format, or not joining if they don't. In this tile division reconfiguration, the JPEG XR's characteristic is utilized, namely, an image of an arbitrary size is divided into tile areas of variable sizes. The image encoding/decoding unit 309 again performs encoding in accordance with the reconfigured tile division and the encoding format of each tile determined in the above-described step, and stores (saves) the encoded image data in the background image memory area 308b. In this stage, if rendering of the entire page is completed in the rendering immediately before encoding, the encoded image data of the target page is outputted to the image edit processor 220. The image edit processor 220 decodes (decompresses) the encoded image data and performs various image processing, as mentioned above. Thereafter, the printer image processor 219 performs color space conversion for printing and various processing. Then, the device I/F 217 outputs the processing result to the printer engine 202 for having the printer engine 202 execute printing.

Figure 8:
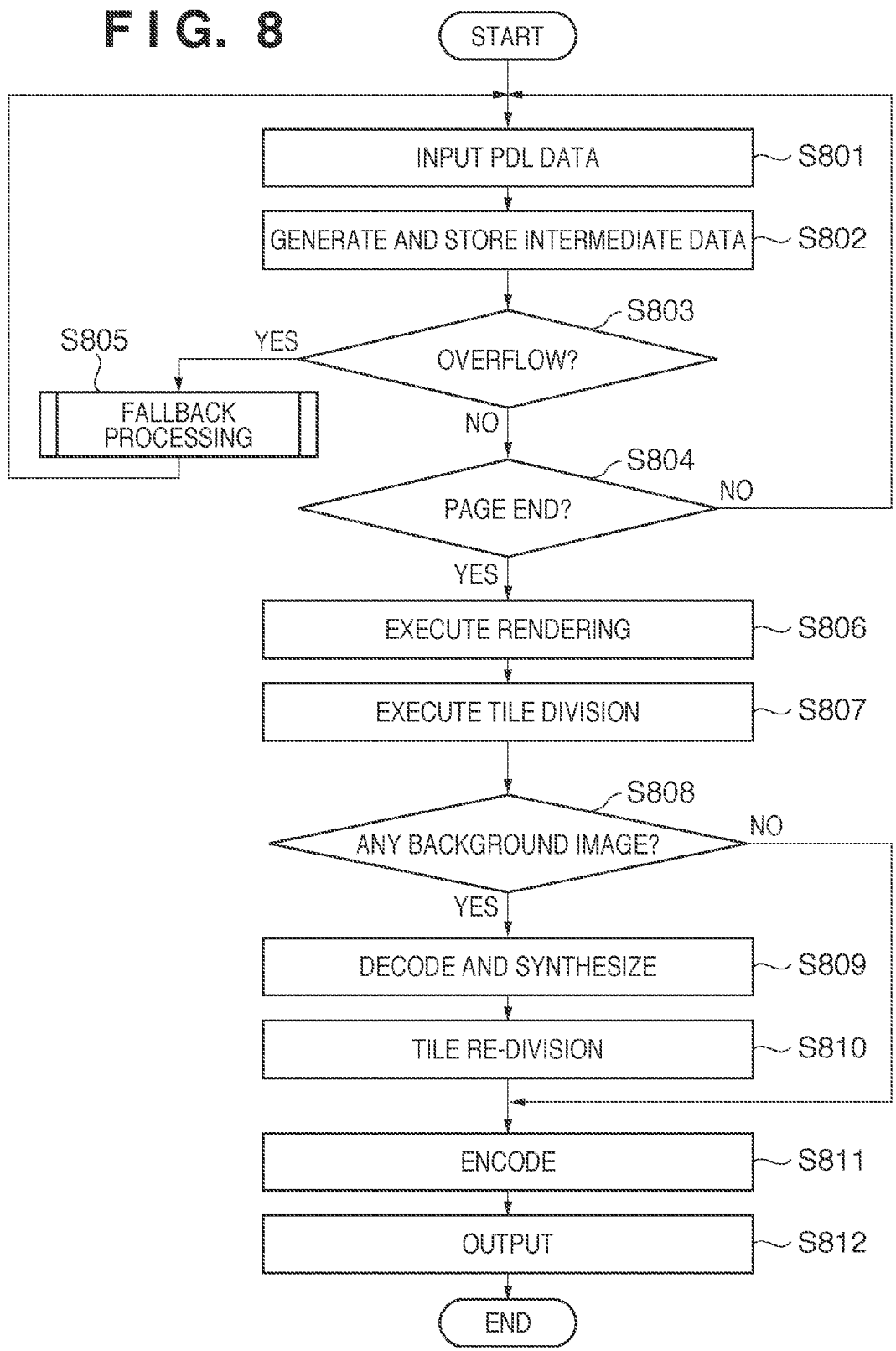
FIG. 8 is a flowchart describing a processing content of a raster-image processor.

FIG. 8 is a flowchart describing an overall control procedure of the RIP 216 according to the embodiment. The processing of the RIP 216 is now described with reference to FIG. 8.

The RIP 216 inputs PDL data (data described in a Page Description Language: FIG. 5), and stores the input data in the input data memory area 305 (S801, S802). The RIP 216 interprets the PDL data, generates intermediate data, and stores the data in the intermediate data memory area 306. Next, the RIP 216 determines whether or not the intermediate data memory area 306 overflows, and whether or not the generated intermediate data indicates a page end (S803, S804). If it is determined that an overflow has not occurred and intermediate data indicative of a page end has not been generated, the RIP 216 repeats the above-described processing (S801 to S804), as the processing is partway through the page.

In the above-described loop, if a memory overflow occurs in the intermediate data memory area 306 while the processing is partway through the page, fallback processing is executed (S805). Details of the fallback processing will be described later. By virtue of the fallback processing, at least the intermediate data memory area 306 is cleared and intermediate data generation for the subsequent PDL data can be resumed; therefore, the processing returns to S801.

When intermediate data generation for the entire page is completed in the above-described manner, the RIP 216 performs rendering in the work memory area 308a in accordance with the intermediate data stored in the intermediate data memory area 306 and performs tile division (S806, S807). Along with the rendering, the RIP 216 stores attribute data in units of each pixel in the object attribute memory area 308c.

An attention should be called to the fact that the intermediate data used in the rendering in S806 is not always intermediate data of the entire target page. More specifically, the intermediate data may only include data from the midway to the page end, because of fallback processing performed in the middle of the target page. In the latter case, that is, in a case where rendering is performed based on the intermediate data from the midway to the page end, the image that had been rendered before the processing proceeded to the midway of the page should be stored in the background image memory area 308b as encoded data of the background image; therefore, the determination in S808 advances to YES. The encoded image data stored in the background image memory area 308b is decoded, and the decoded image is synthesized with the resultant image rendered in S806 (S809). In the decoding process, information indicative of how tile division was performed in the encoded image data can be obtained. Based on this information and tile division information of the image rendered in S806, tile division is performed again for the entire page (S810), and the processing proceeds to S811.

Meanwhile, if fallback processing has not been performed during the intermediate data generation for the entire page, the determination in S808 advances to NO, and the processing proceeds to S811 without executing S809 and S810.

Next, in accordance with the rendering result, tile division, and tile attribute of the target page, it is determined which encoding method: lossless-encoding or lossy-encoding, is to be used for each tile, and in a case of lossy-encoding, a quantization coefficient is determined; and thereby encoding is performed (S811). In this embodiment, encoding is performed using JPEG XR, wherein an image can be divided at arbitrary positions in the horizontal or vertical direction, lossless or lossy encoding can be set for each divided area (tile), and a quantization coefficient can be set in the tile in case of lossy-encoding. The RIP 216 outputs the encoded data for the entire page to the image edit processor 220 (S812).

Figure 9:
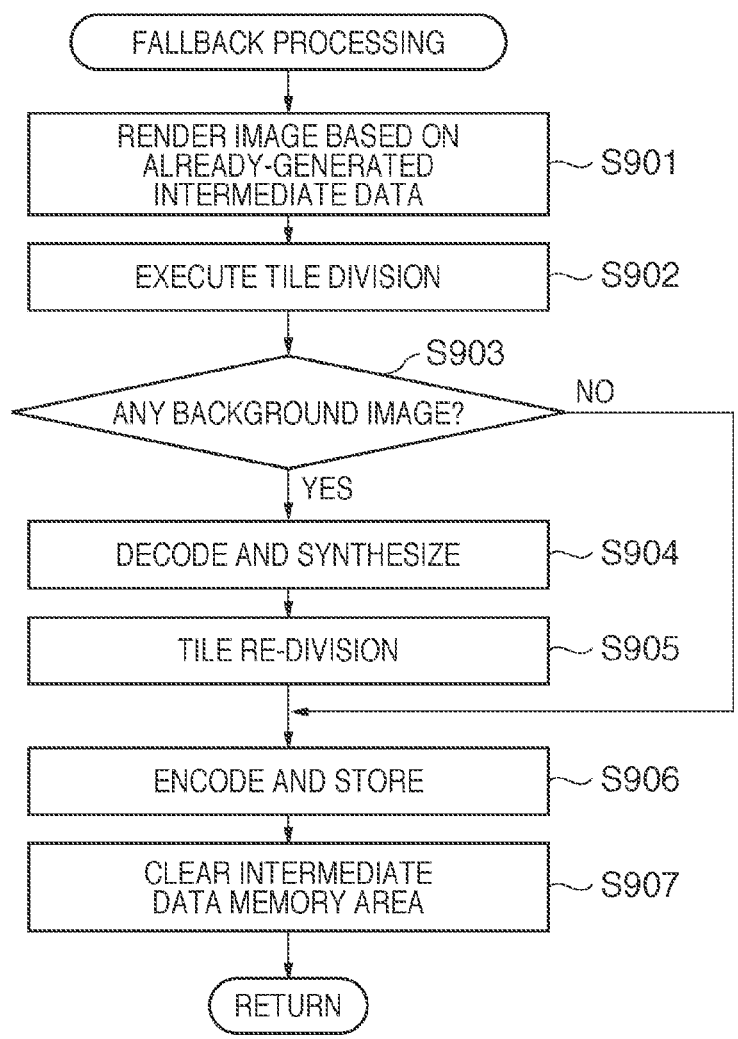
FIG. 9 is a flowchart describing fallback processing.

The fallback processing (S805) in the above-described process is now described with reference to the flowchart in FIG. 9. It should be noted that fallback processing is performed in a case where the intermediate data memory area 306 overflows, and can occur plural numbers of times during the intermediate data generation for a page.

First, the RIP 216 executes rendering processing in the work memory area 308a in accordance with all the intermediate data which has already been stored in the intermediate data memory area 306, and stores attribute data of each pixel in the object attribute memory area 308c (S901). Next, the RIP 216 performs tile division by referring to the object attribute memory area 308c and extending each side of the circumscribed rectangle contacting with each rendered object. Note that if adjacent objects have the same attribute, these objects are regarded as one object in tile division (S902).

Next, the RIP 216 determines whether or not encoded image data of a background image has been stored in the background image memory area 308b (S903). In other words, the RIP 216 determines if fallback processing this time is at least the second or further time since the start of intermediate data generation of the target page. In a case of first fallback processing, there is no memory overflow in the past, and no encoded image data of a background image is stored in the background image memory area 308b. In this case, the determination result in S903 is NO. In a case where fallback processing this time is at least the second or further time since the start of intermediate data generation of the target page, a memory overflow has occurred once before, and encoded image data of a background image has been stored in the background image memory area 308b. In this case, the determination result in S903 is YES, and processing in S904 and S905 are executed. The processing in S904 and S905 are the same as the above-described processing in S809 and S810. More specifically, the image (and attribute) data that has been encoded is synthesized with the image (and attribute) data rendered this time, and tile division reconfiguration is performed.

Based on the determined tile division and attribute, an encoding parameter is determined for each tile, encoding according to JPEG XR is executed, and the obtained encoded image data is stored in the background image memory area 308b as encoded data of the background image (S906). Then, the intermediate data memory area 306 is cleared (S907), and the fallback processing ends.

Note that there may be a case that the amount of encoded image data is larger than a vacant capacity of the background image memory area 308b. In this case, each of the divided tiles is arranged in the order of attributes, namely, halftone images, graphics, and texts. First, the quantization coefficient of the tile which is attributed as "halftone images" is gradually increased to a predetermined upper limit value so as to reduce the amount of encoded data. In the course of increasing the quantization coefficient, if it is determined that the amount of encoded data becomes smaller than the vacant capacity of the background image memory area 308b, the halftone image is encoded in accordance with the quantization coefficient, and stored in the background image memory area 308b. If the amount of encoded data does not become smaller than the vacant capacity of the background image memory area 308b even if the quantization coefficient reaches the predetermined upper limit value, then, the tile attributed as "graphics" is subjected to the similar processing.

Figure 10:
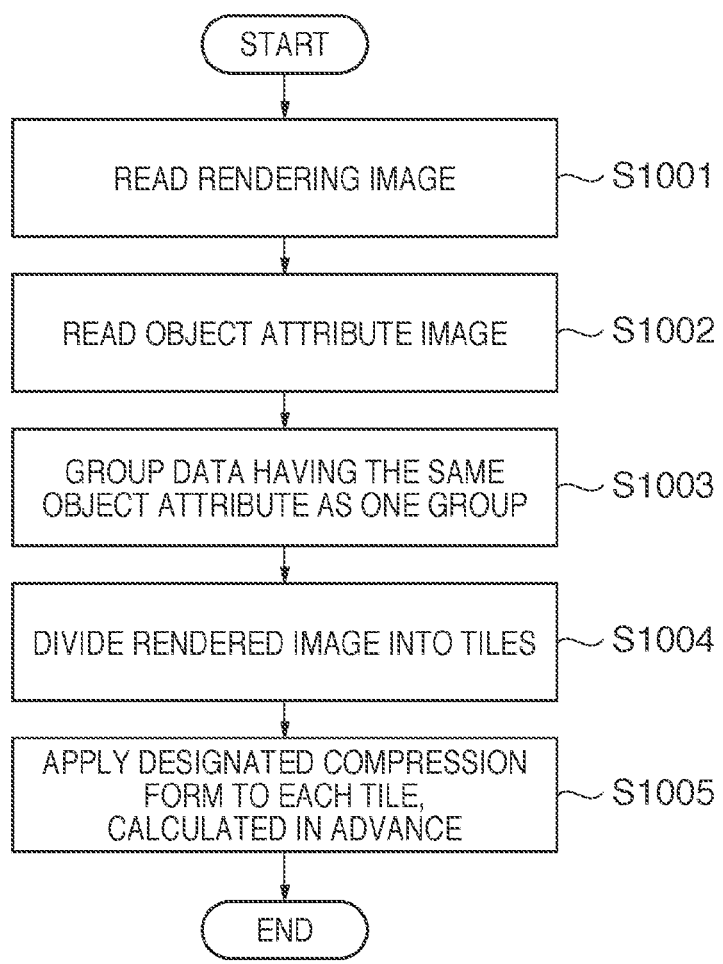
FIG. 10 is a flowchart of tile division processing.

FIG. 10 is a flowchart describing the processing of tile re-division (tile reconfiguration) in S810 and S905 according to the present embodiment. The flowchart shows a sequence of tile division performed on a raster image based on an object's attribute bit in order to cope with different image encoding methods, in a fallback state shown in FIG. 6A. If objects have the same image encoding method, the objects are taken as one tile; but if not, the objects need to be divided by an object's bound or the like. First, rendered images (one of them is a decoded image) are read from the work memory area 308a and the background image memory area 308b respectively (S1001). Similarly, object attribute data are read from the work memory area 308a and the object attribute memory area 308c in FIG. 3 respectively (S1002). Next, the data having the same object attribute are grouped as one group (S1003). Next, the rendered image is subjected to tile division (S1004). This tile division bases upon the result of grouping in S1003. Then, the type of encoding (lossless-encoding or lossy-encoding, and in a case of lossy-encoding, a quantization coefficient) is determined for each tile, which is defined by extending each side of the circumscribed rectangle (constructed with horizontal and vertical segments) contacting with each of the grouped objects (S1005).

As has been described above, according to the present embodiment, in a case where print data described in a PDL is converted from print data to intermediate data and a print-target image is rendered based on the intermediate data, even if fallback processing occurs, the data is divided into the most appropriate tiles in accordance with the attribute, and encoded based on the most appropriate encoding parameter determined for each tile. Therefore, it is possible to reduce image quality deterioration and suppress print performance reduction.

Note that, although the present embodiment provides an example in which the invention is applied to a multi-function peripheral shown in FIG. 1, an apparatus having solely a printing function may be adopted. Therefore, the above-described embodiment shall not limit the present invention.

Other Embodiments

Aspects of the present invention can also be realized by a computer of a system or apparatus (or devices such as a CPU or MPU) that reads out and executes a program recorded on a memory device to perform the functions of the above-described embodiment, and by a method, the steps of which are performed by a computer of a system or apparatus by, for example, reading out and executing a program recorded on a memory device to perform the functions of the above-described embodiment. For this purpose, the program is provided to the computer for example via a network or from a recording medium of various types serving as the memory device (e.g., computer-readable medium).

While the present invention has been described with reference to an exemplary embodiment, it is to be understood that the invention is not limited to the disclosed exemplary embodiment. The scope of the following claims is to be accorded the broadest interpretation so as to encompass all such modifications and equivalent structures and functions.

This application claims the benefit of Japanese Patent Application No. 2009-209812, filed Sep. 10, 2009, which is hereby incorporated by reference herein in its entirety.

What is claimed is:

1. An image forming apparatus which forms an image on a print medium based on print data described in a page description language, comprising:
  a conversion unit configured to convert inputted print data described in a page description language to intermediate data which is appropriate for rendering, and store the converted intermediate data into an intermediate data memory set in advance;
  a rendering unit configured to generate raster image data in accordance with the intermediate data stored in the intermediate data memory, and to generate attribute data for each pixel in the raster image data;
  an encoding/decoding unit configured to be able to set an encoding parameter for a tile, generate encoded data of each tile in accordance with the set encoding parameter, and store the generated encoded data into an encoded data memory set in advance, and configured to decode the encoded data stored in the encoded data memory;
  a determination unit configured to, in a case where an overflow occurs in the intermediate data memory while said conversion unit is converting to the intermediate data for a page of interest and storing the intermediate data into the intermediate data memory, determine whether or not the overflow is a first time or a second or further time for the page of interest;
  a fallback processing unit configured to, in a case where an overflow occurs in the intermediate data memory while said conversion unit is converting to the intermediate data for the page of interest and storing the intermediate data into the intermediate data memory, execute fallback processing in accordance with a determination result of said determination unit; and
  an image forming unit configured to, when rendering is completed based on the intermediate data for the page of interest, execute image forming processing based on image data obtained as a rendering result,
  wherein, (i) in a case where an overflow occurs in the intermediate data memory while said conversion unit is converting to the intermediate data for the page of interest and storing the intermediate data into the intermediate data memory, said fallback processing unit controls said rendering unit to perform rendering in accordance with the intermediate data which has already been stored in the intermediate data memory,
  (ii-1) in a case where the determination by said determination unit indicates that the overflow is a first time, said fallback processing unit performs tile division on the rendered image data in accordance with the attribute data of each object of the rendered image data, determines an encoding parameter for each tile, and controls said encoding/decoding unit to encode each tile in the rendered image data in accordance with the determined encoding parameter to store each encoded tile data into the encoded data memory;

(ii-2) in a case where the determination by said determination unit indicates that the overflow is a second or further time, said fallback processing unit controls said encoding/decoding unit to decode each encoded tile data having already been stored in the encoded data memory due to a previous overflow, synthesizes the rendered image data with the decoded image data, performs the tile division based on attribute data of the synthesized image data, determines an encoding parameter for each tile, and controls said encoding/decoding unit to re-encode each tile in the synthesized image data in accordance with the determined encoding parameter to store each encoded tile data into the encoded data memory, and (iii) said fallback processing unit clears the intermediate data memory after each encoded tile data has been stored in the encoded data memory, and said conversion unit resumes conversion processing.

2. The apparatus according to claim 1, wherein said encoding/decoding unit performs encoding and decoding in accordance with JPEG XR, wherein a boundary line of tile division performed by said fallback processing unit is an extended line of each side of a circumscribed rectangle contacting with an object, which is constructed with pixels having a same attribute.

3. The apparatus according to claim 2, wherein the attribute includes three types: a text, a graphic, and a halftone image, said encoding parameter includes a parameter indicative of lossless-encoding or a parameter indicative of lossy-encoding, and said fallback processing unit determines a parameter indicative of lossless-encoding for a tile having a text attribute, while determining a parameter indicative of lossy-encoding for a tile having a graphic attribute or a halftone-image attribute.

4. The apparatus according to claim 1, wherein when two adjacent objects have a same attribute, said fallback processing unit joins the two objects as one object, and then performs tile division.

5. A control method of an image forming apparatus which forms an image on a print medium based on print data described in a page description language, comprising:

a conversion step of converting inputted print data described in a page description language to intermediate data which is appropriate for rendering, and storing the converted intermediate data into an intermediate data memory set in advance;

a rendering step of generating raster image data in accordance with the intermediate data stored in the intermediate data memory, and also generating attribute data for each pixel in the raster image data;

an encoding/decoding step of setting an encoding parameter for a tile, generating encoded data of each tile in accordance with the set encoding parameter, and storing the generated encoded data into an encoded data memory set in advance, and of decoding the encoded data stored in the encoded data memory;

a determination step of, in a case where an overflow occurs in the intermediate data memory while converting to the intermediate data for a page of interest and storing the intermediate data into the intermediate data memory are performed in said conversion step, determining whether or not the overflow is a first time or a second or further time for the page of interest;

a fallback processing step of, in a case where an overflow occurs in the intermediate data memory while converting to the intermediate data for the page of interest and storing the intermediate data into memory are performed in said conversion step, executing fallback processing in accordance with a determination result of said determination step; and an image forming step of, when rendering is completed based on the intermediate data for the page of interest, executing image forming processing based on image data obtained as a rendering result, wherein in said fallback processing step, (i) in a case where an overflow occurs in the intermediate data memory while converting to the intermediate data for the page of interest and storing the intermediate data into the intermediate data memory are performed in said conversion step, said rendering step is controlled to perform rendering in accordance with the intermediate data which has already been stored in the intermediate data memory, (ii-1) in a case where the determination in said determination step indicates that the overflow is a first time, tile division is performed on the rendered image data in accordance with the attribute data of each object of the rendered image data, an encoding parameter is determined for each tile, said encoding/decoding step is controlled to encode each tile in the rendered image data in accordance with the determined encoding parameter to store each encoded tile data into the encoded data memory;

(ii-2) in a case where the determination in said determination step indicates that the overflow is a second or further time, said encoding/decoding step is controlled to decode each encoded tile data having already been stored in the encoded data memory due to a previous overflow, the rendered image data is synthesized with the decoded image data, the tile division is performed based on attribute data of the synthesized image data, an encoding parameter is determined for each tile, and said encoding/decoding step is controlled to re-encode each tile in the synthesized image data in accordance with the determined encoding parameter to store each encode tile data into the encoded data memory, and (iii) the intermediate data memory is cleared after each encoded tile data has been stored in the encoded data memory, and conversion processing of said conversion step is resumed.

* * * * *